US007272284B1

(12) United States Patent
Pluister

(10) Patent No.: US 7,272,284 B1
(45) Date of Patent: Sep. 18, 2007

(54) BUNDLED CABLES AND METHOD OF MAKING THE SAME

(75) Inventor: Andrew M. Pluister, Racine, WI (US)

(73) Assignee: Honeywell International Inc., Morristown, NJ (US)

( * ) Notice: Subject to any disclaimer, the term of this patent is extended or adjusted under 35 U.S.C. 154(b) by 381 days.

(21) Appl. No.: 10/768,418

(22) Filed: Jan. 29, 2004

(51) Int. Cl.
  *G02B 6/04* (2006.01)
  *H01B 5/08* (2006.01)
(52) U.S. Cl. ...................... 385/115; 174/113
(58) Field of Classification Search ............... 385/115; 174/113
  See application file for complete search history.

(56) References Cited

U.S. PATENT DOCUMENTS

| | | | |
|---|---|---|---|
| 4,844,604 A * | 7/1989 | Bishop et al. ............... | 385/115 |
| 4,997,689 A * | 3/1991 | Langen et al. .............. | 428/34.9 |
| 5,132,488 A | 7/1992 | Tessier et al. | |
| 5,321,202 A * | 6/1994 | Hillburn ...................... | 174/36 |
| 5,369,720 A | 11/1994 | Parry et al. | |
| 5,789,711 A | 8/1998 | Gaeris et al. | |
| 5,908,873 A * | 6/1999 | Shustack ..................... | 522/39 |
| 5,952,615 A | 9/1999 | Prudhon | |
| 5,969,295 A | 10/1999 | Boucino et al. | |
| 6,125,224 A * | 9/2000 | Benzel ........................ | 385/114 |
| 6,297,454 B1 | 10/2001 | Gareis | |
| 6,304,698 B1 * | 10/2001 | Morris ........................ | 385/100 |
| 6,395,393 B1 * | 5/2002 | Akita et al. ................. | 428/378 |
| 6,455,607 B1 * | 9/2002 | Shustack ..................... | 522/42 |
| 6,498,883 B1 * | 12/2002 | Wilson ........................ | 385/114 |
| 6,559,385 B1 | 5/2003 | Johnson et al. | |
| 6,624,359 B2 * | 9/2003 | Bahlmann et al. ......... | 174/113 C |
| 6,639,152 B2 | 10/2003 | Glew | |
| 2003/0118296 A1 * | 6/2003 | Smith .......................... | 385/102 |
| 2004/0262027 A1 * | 12/2004 | Kaczmarski ............... | 174/113 R |

OTHER PUBLICATIONS

Article titled "Belden Homechoice Banana Peel CAT 5E Composite Cables Feature a Unique Jacketless Design" appearing on www.hometoys.com website.

* cited by examiner

*Primary Examiner*—Howard Weiss
*Assistant Examiner*—Shrinivas H. Rao
(74) *Attorney, Agent, or Firm*—Scully, Scott, Murphy & Presser, P.C.

(57) ABSTRACT

Bundled cables and a method for maintaining a plurality of cables together during use and installation and for allowing the cables to be easily separated for termination or connectorization. The bundled cables include a plurality of cables and a central flexible strip coated with a thermoplastic heat-sealable resin for semi-permanently bundling the cables. In operation, the strip is heated to activate the heat-sealable resin. The cables are then placed in contact with the strip to bind to the strip as the heat-sealable resin cools. The bond created by the heat-sealable resin is strong enough to hold the cables together during installation and use but allows the cables to be easily separated in whole or in part from the bundle.

8 Claims, 3 Drawing Sheets

BUNDLED CABLES AND METHOD OF MAKING THE SAME

FIELD OF THE INVENTION

This invention relates in general to bundled cables and a method for making the same, and particularly, to bundled cables that maintain the cables in place during installation and use and which permit the cables to be easily removed by hand from the bundle for termination or connectorization.

BACKGROUND OF THE INVENTION

With the increased use of computers and other electronic devices being commonplace in buildings and other structures, the installation of cables (such as cables used to provide voice, data and video distribution throughout building such as houses, condominiums, apartment complexes, schools and the like) has become an important part of both new construction and in renovating old buildings. Installation of electrical or other cables often involves feeding a number of cables through a length of ductwork or other conduits. As there are often numerous cables that must be installed, it is accordingly advantageous to bundle cables together to permit a plurality of cables to travel through the conduits or ductwork of the building at the same time. As different cables will need to be connected at different points in the building and to different cables, devices, or systems, it is important that the cables be easily separable for termination or connectorization.

One known way to bundle cables is to surround a plurality of cables with an outer jacket. The cables may be separated within the jacket through a central spline or similar device. While use of an outer jacket to cover the cables may work in certain situations, several problems have arisen during their use. First, in order to separate the cables for termination or connectorization, it is necessary to peel off the outer jacket resulting in, among other things, increased labor costs. Further, the use of an outer jacket increases the overall size and weight of the bundled cables.

Another known way to bundle cables is to tie a plurality of cables together using a plastic strap or tie having a locking mechanism on one end. Once the cables are tied together, they may be pulled through the ductwork or conduit. However, during installation, the cables tend to separate or pull apart, making it more difficult to pull the cables through the conduit and leading to possible damage to the cables.

Another known way to bundle cables is to weld the cables to an extruded rigid central spline. An example of such a system is the HomeChoice® Banana Peel™ products manufactured and sold by Belden Wire & Cable Co. of Richmond, Ind. However, it is often difficult to remove the individual cables from the central spline for termination or connectorization of the cables. Furthermore, the rigidity of the spline also makes the overall bundle of cables rigid, thereby making it more difficult to bend or otherwise maneuver the bundle during installation. The spline is also susceptible to cracking when the bundled cables are bent at cold temperatures.

Therefore, there is a need to produce a bundled cable that is flexible, lightweight and allows the cables to be easily removed for termination or connectorization, while being economical and easy to manufacture and install.

SUMMARY OF THE INVENTION

The present invention is an innovative improvement over the prior devices and ways to bundle cables together in that the way that the cables are semi-permanently attached using a flexible strip or tape coated with a thermoplastic heat-sealable resin such that they may be easily removed by hand is an improvement over the prior art. In particular, the bundled cables and method of making bundled cables of the present invention includes a central flexible strip or adhesive tape having a heat-sealable resin that may be heated and cooled to allow a plurality of cables to be removably attached to the tape.

In operation, the strip or tape is heated to a sufficient temperature to activate the heat-sealable resin. The cables are then wrapped around the strip. As the adhesive cools to room temperature, the cables become bound to the strip. The bond between the strip and the cables is strong enough to maintain the cables in place during installation and use, while still permitting the cables to be easily removed by hand for termination or connectorization.

It is therefore an object of the present invention to provide a new and improved system and method to bundle cables that allows cables to be held together during installation and use, but easily separated for termination or for use.

Another object of the present invention is to provide a system and method for creating bundled cables that are flexible.

A further object of the present invention is to provide a system and method for creating bundled cables that are lightweight.

A yet further object of the present invention is to provide a system and method for providing bundled cables having a lower brittle point temperature.

Another object of the present invention is to provide bundled cables that allow for the instant identification of the individual cables.

Yet another object of the present invention is to provide a system and method for providing bundled cables that are easy and economical to manufacture.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
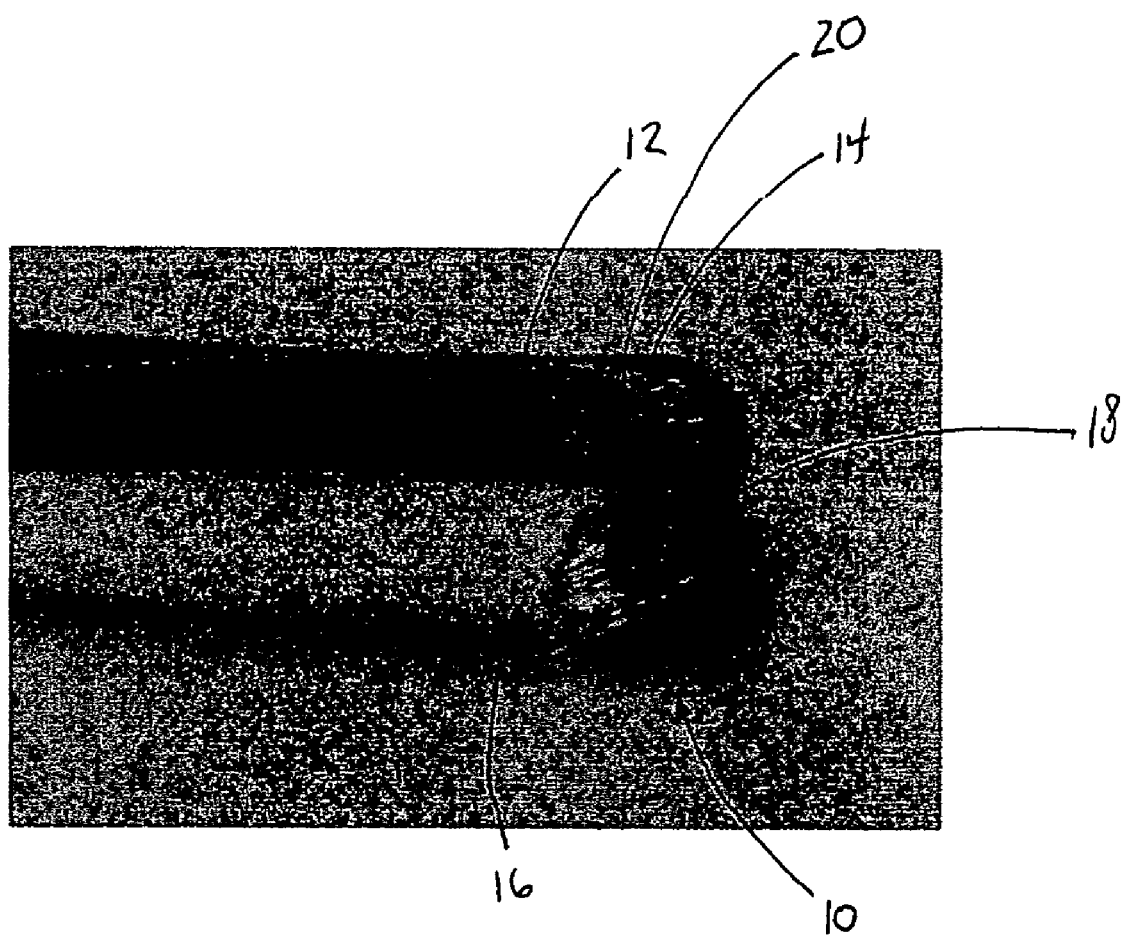
FIG. 1 is a perspective view of an embodiment of the bundled cables of the present invention showing four cables being removably connected to a flexible strip.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Figure 2:
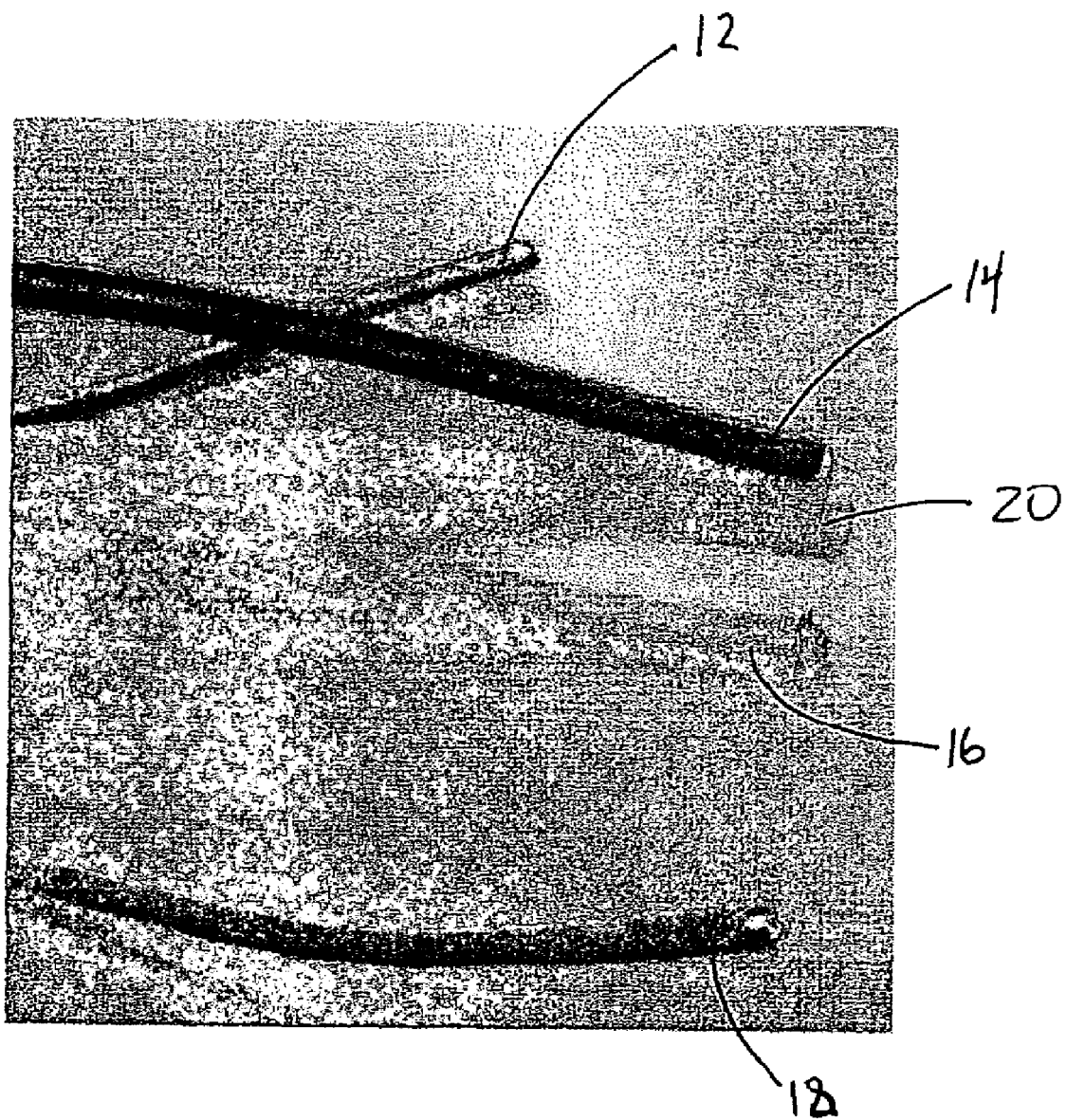
FIG. 2 is an exploded perspective view showing four cables and a flexible strip.

Referring now to the drawings, and particularly to FIGS. 1 through 2, there is shown a preferred embodiment of the present invention. The bundled cables of the present invention, generally designated by the numeral 10, comprises a plurality of cables 12, 14, 16, 18 and a central flexible strip or tape 20. While a bundled cable having four cables and one flexible strip is shown and disclosed, it is appreciated that any number of cables and flexible strips may be used and not depart from the scope of the present invention. It is also appreciated that a flexible central member other than a strip or tape may be used and not depart from the scope of the present invention.

The cables 12, 14, 16, 18 are preferably individually jacketed cables. In a preferred embodiment, two of the cables are Category 5e #24 gauge, four pair cables with flame-retardant PVC jackets for voice and data communication, and two of the cables are RG-6/U cables with flame retardant PVC jackets for video and data services. However, it is appreciated that the cables may be of any of a variety of different cables and not depart from the scope of the present invention.

Figure 3:
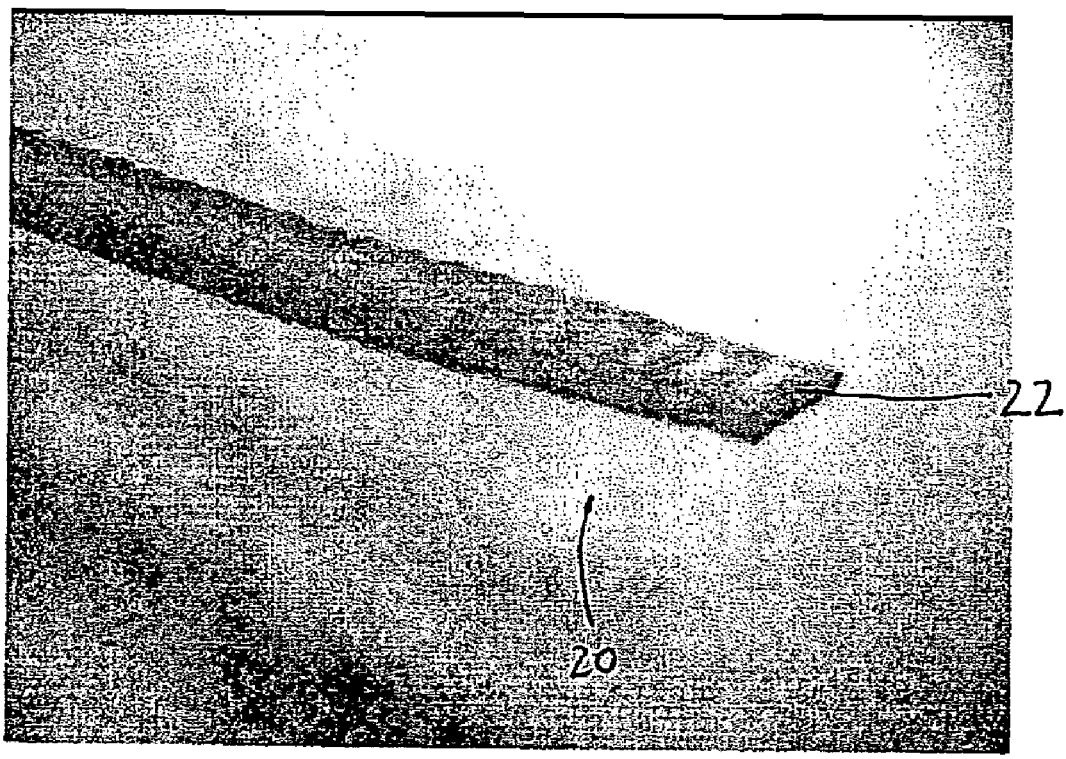
FIG. 3 is a perspective view of a flexible strip of the present invention.

The strip or tape 20 is preferably a flat ⅜ inch wide woven polyester tape, however, it is appreciated that a variety of different types and sizes of tape or other flexible strips may be used and not depart from the scope of the present invention. Referring now to FIG. 3, the tape 20 is preferably coated in a known way with a heat-activated adhesive such as a thermoplastic heat-sealable resin 22. The heat-sealable resin is activated by heating the tape to or past the melting point of the heat-sealable resin by an inline heater or other heat source. Although a flexible tape having a heat-sealable resin coated thereon is shown and disclosed, it is appreciated that other heat-activated adhesives or other adhesives may be used, or one or more adhesive strips may be attached to the flexible strip, and not depart from the scope of the present invention.

In operation, the tape 20 with the adhesive 22 is heated to a temperature that is equal to or greater than the melting point of the heat-sealable resin (e.g., to approximately 270 degrees Fahrenheit). Each of the plurality of cables 12, 14, 16, 18 is then placed onto and, if desired, wrapped around the tape. In the preferred embodiment, one Category 5e cable and one RG-6/U cable are placed on each side of the flat tape. As the tape cools, the heat-sealable resin will bond to the plurality of cables. The bond created by the heat-sealable resin is strong enough to hold the cables together during normal installation procedures and during use, but allows the cables to be pulled apart by hand to permit the cables to be attached or terminated. In the preferred embodiment, the adhesive bond is not affected by cold temperatures and remains strong up to 120 degrees Fahrenheit. Bundling the cables according to the present invention also yields a bundle of cables that is less brittle at cold temperatures then conventional bonding systems.

Once the cables are bundled, the bundle of the present invention may be fed through a conduit or ductwork for installation. As the bundle does not require the use of an outer jacket, the bundle of the present invention will be smaller and easier to feed through the conduit or ductwork then conventional bundles. Furthermore, unlike the prior bundling systems that use, among other things, an outer jacket or a rigid spline, the use of a substantially flexible strip of material or adhesive tape increases the ability (i.e., flexibility) of the bundle of cables to be bent or otherwise maneuvered during installation. Once the bundle is pulled through the conduit or ductwork, one or more of the cables may be removed from the bundle by pulling or otherwise separating the individual cables away from the bundle so as to overcome the bond of the heat-sealable resin.

It will be understood that modifications and variations may be effected without departing from the scope of the novel concepts of the present invention, but it is understood that this application is limited only by the scope of the appended claims.

The invention claimed is:

1. A bundle of cables comprising:
a substantially flexible central member consisting of a flexible strip having a first side and a second side;
an adhesive located on at least one of said first and second sides of the substantially flexible central member; and
a plurality of cables including at least four cables, wherein at least two of the cables are Category 5e cables and at least two of the cables are RG-6/U cables for semi-permanent bonding to the adhesive of the substantially flexible central member in a bundled externally accessible fashion about said flexible strip to facilitate manual detachment of one or more of said cables from said adhesive on the flexible central member.

2. The bundle of cables of claim 1 wherein adhesive is heat-activated.

3. The bundle of cables of claim 1 wherein the adhesive is a thermoplastic heat sealable resin.

4. The bundle of claim 3 wherein the thermoplastic heat sealable resin is a hot melt adhesive.

5. The bundle of cables of claim 1 wherein the flexible strip is a woven polyester tape.

6. The bundle of cables of claim 5 wherein the adhesive is a thermoplastic heat-sealable resin.

7. The bundle of claim 1 wherein the adhesive is located on the first and second sides of the flexible central member.

8. Bundled cables comprising:
a plurality of cables; including at least four cables, wherein at least two of the cables are category 5e cables and at least two of the cables are RG-6/u cables at least one substantially flexible strip having first and second sides; and a thermoplastic heat-sealable resin constituted of a hot melt adhesive being associated with at least one of the sides of the at least one flexible strip for removably bundling and semi-permanently attaching in an externally accessible manner the cables to the flexible strip to facilitate manual detachment of one or more of said cables from said flexible strip.

* * * * *